US012654865B2

(12) United States Patent
Stothers et al.

(10) Patent No.: US 12,654,865 B2
(45) Date of Patent: Jun. 16, 2026

(54) APPARATUS AND METHOD FOR DETECTING WATER OR ICE

(71) Applicant: Ultra Electronics Limited, London (GB)

(72) Inventors: Ian Stothers, Cambridge (GB); Robert William Saunders, London (GB)

(73) Assignee: Ultra PCS Limited, Cheltenham (GB)

( * ) Notice: Subject to any disclaimer, the term of this patent is extended or adjusted under 35 U.S.C. 154(b) by 980 days.

(21) Appl. No.: 17/778,732

(22) PCT Filed: Nov. 25, 2020

(86) PCT No.: PCT/EP2020/083338
§ 371 (c)(1),
(2) Date: May 20, 2022

(87) PCT Pub. No.: WO2021/105198
PCT Pub. Date: Jun. 3, 2021

(65) Prior Publication Data
US 2022/0411079 A1 Dec. 29, 2022

(30) Foreign Application Priority Data

Nov. 29, 2019 (GB) ..................................... 1917419

(51) Int. Cl.
*B64D 15/20* (2006.01)
*B64D 15/12* (2006.01)
(Continued)

(52) U.S. Cl.
CPC ............. *B64D 15/20* (2013.01); *B64D 15/12* (2013.01); *G01N 25/00* (2013.01); *H05B 1/0236* (2013.01)

(58) Field of Classification Search
CPC .... A63C 1/00; A63C 1/30; A63C 3/00; A63C 5/06; B64D 15/00; B64D 15/12;
(Continued)

(56) References Cited

U.S. PATENT DOCUMENTS

2005/0268710 A1 12/2005 Rasmussen et al.
2007/0112480 A1 5/2007 Smith et al.
(Continued)

FOREIGN PATENT DOCUMENTS

GB 2483530 A 3/2012
GB 2509729 A 7/2014
WO WO 2008/145985 A2 12/2008

*Primary Examiner* — Sang Y Paik
(74) *Attorney, Agent, or Firm* — Blank Rome LLP

(57) ABSTRACT

The present invention relates to an apparatus and method for detecting the presence of water or ice on a structure, for example on the surface of an aircraft. A plurality of heaters (202-214) are thermally coupled to a structure (for example on the back of a wing) (104) in order to detect the presence of water or ice on the structure. The heaters are arranged adjacent one another from a GC region of a leading edge (106) of the structure (that is exposable to an impinging airflow) and extending aft of the leading edge of the structure. The heaters, which may be controlled individually, are supplied power that is sufficient to heat the surface of the structure to substantially the same temperature. A controller senses the power required for the heaters to achieve the same surface temperature at the respective regions. By comparing the power consumed by a heater that is aft of the fore-most heater (214), and the power consumed by a heater fore of the aft-most heater (210), a determination of the presence of water or ice can be made if the power consumed by the heater that is aft of the fore-most heater is different to the power consumed by the heater that is fore of the aft-most heater.

23 Claims, 5 Drawing Sheets

(51) Int. Cl.
*G01N 25/00*      (2006.01)
*H05B 1/02*      (2006.01)

(58) Field of Classification Search
CPC ........ B64D 15/14; B64D 15/20; G01N 25/00;
                   H05B 1/02; H05B 3/84
USPC ........................................................ 219/202
See application file for complete search history.

(56)                References Cited

U.S. PATENT DOCUMENTS

| | | |
|---|---|---|
| 2009/0149997 A1 | 6/2009 | Stothers |
| 2009/0230239 A1 | 9/2009 | Stothers |
| 2010/0243811 A1 | 9/2010 | Stothers |
| 2012/0061482 A1* | 3/2012 | Stothers ................. B64D 15/20 |
| | | 237/2 R |
| 2014/0007654 A1 | 1/2014 | Lilie et al. |
| 2014/0263838 A1* | 9/2014 | Snir ....................... B64D 15/22 |
| | | 244/134 F |
| 2015/0346122 A1 | 12/2015 | Stothers et al. |
| 2019/0300183 A1 | 10/2019 | Clavel et al. |

* cited by examiner

APPARATUS AND METHOD FOR DETECTING WATER OR ICE

FIELD OF THE INVENTION

The present invention relates to an apparatus and method for detecting the presence of water or ice on a structure, for example on the surface of an aircraft.

BACKGROUND OF THE INVENTION

Devices for detecting the presence of water or ice on structures, for example aircraft structures, are known. Example devices include those that detect ice formation using optical means (i.e. detecting a change in opacity or refractive index around a sensor). Others include those that monitor changes in a resonant frequency of a structure (i.e. the accumulation of ice on a structure alters its resonant frequency).

Preferably, ice detection methods only detect the impingement of water that is likely to 'stick' to the surface of a structure. Water crystals, for example, usually bounce off a structure, and thus are less likely to accrete on a surface and thus are unlikely to cause problems.

Some devices used to detect the presence of water or ice on a structure include Pitot-type detectors, which ingest all forms of water, including crystals (which usually just bounce off the structure). They cannot distinguish between 'sticky' and 'non-sticky' water. Pitot-type detectors can also become blocked (and need regular cleaning).

In GB 2483530, we described a scheme in which the ice detection system was driven to detect an icing condition based on the power required to heat first and second heaters to different temperatures in a temperature range. However, it has been found that the described schemes sometimes do not detect icing conditions due to heat spread through the skin and due to insufficient temperature measurement accuracies.

In GB2509729 we describe a system that detects the presence of water or ice by heating different heater mats to heat the respective surface of the structure and comparing the power required to achieve that temperature to a reference power, where the reference power is to achieve the same surface temperature in a dry-air condition.

This determination is based on the use of a model for the dry air conditions of the structure.

We have appreciated the need for alternative methods and systems for detecting the presence of water or ice.

SUMMARY OF THE INVENTION

The present invention provides a method, apparatus and controller for detecting the presence of water or ice on a structure in accordance with the independent claims appended hereto. Further advantageous embodiments are contained in the dependent claims, also appended hereto.

We describe a method of detecting the presence of water or ice on a surface of a structure, the structure having a surface exposable to an impinging airflow, the method comprising the steps of: supplying each of a plurality of heaters with a respective power, the plurality of heaters being in thermal contact with the structure and arranged adjacent one another from a region of a leading edge of the structure and extending aft of the leading edge of the structure, each of the respective powers being sufficient to heat a surface of the structure at each of the respective regions associated with the respective heaters to substantially the same surface temperature; sensing a first power being supplied to a first heater and sensing a power being supplied to a second heater, the first heater being aft of the fore-most heater, and the second heater being fore of the aft-most heater; comparing the first and second powers consumed by the respective first and second heaters; detecting the presence of water or ice on the surface of the structure based on the comparison of the first and second powers consumed by the respective first and second heaters, wherein water or ice is detected when the power consumed by the first heater is different to the power consumed by the second heater.

The method enables systems that already comprise heaters for heating a structure (for example in an ice removal or protection system) to detect the presence of water or ice on the surface of the structure. From that determination a decision can be made to enable the ice protection system, or this decision may be automated such that intervention is not required in order to remove, or prevent, ice accreting on the surface of the structure.

Water or ice may be detected when the power consumed by the first heater is greater than the power consumed by the second heater, or when the power consumed by the second heater is greater than the power consumed by the first heater.

The method may also comprise calculating a surface temperature, comprising: measuring a temperature of the heater; and calculating the surface temperature from the temperature of the heater, the power applied to the heater, and at least one thermal resistance between the heater and the surface of the structure.

The method may also comprise measuring a temperature of a respective heater; and controlling the power applied to the respective heater using the measured temperature of the heater.

The respective power applied to the respective heater may be controlled such that the surface temperature is sufficient to cause evaporation of water or ice in contact with the surface of the structure at the respective region.

The method may further comprise identifying a region aft of the first heater having water or ice thereon by: sensing the power being supplied to a heater aft of the first heater; comparing the power being consumed to the heater aft of the first heater with the second power consumed by the respective second heater; and detecting the presence of water or ice on the surface of the structure based on the comparison of the respective powers consumed by the respective heater aft of the first heater and the second heater, wherein water or ice is detected when the power consumed by the heater aft of the first heater is different t the power consumed by the second heater. Water or ice may be detected when the power consumed by the respective heater aft of the first heater is greater than the power consumed by the second heater, or when the power consumed by the second heater is greater than the power consumed by the respective heater aft of the first heater. Sensing an Angle of Attack (AoA) of the structure may also be used in the method, wherein the heater aft of the first heater is dependent on the AoA.

The surface temperature may be heated by a respective heater to greater than or equal to 50° C. above a temperature of the environment to which the structure is exposed.

The method may further comprise generating a warning signal displayable to a user in response to water or ice being detected. The method may further comprise controlling an ice protection system in response to an icing condition being detected, the ice protection system comprising the heaters, and the system being controlled to heat the temperature of the surface at the respective regions associated with the respective heaters so as to remove water or ice from the surface of the structure.

We also describe a method of detecting an icing condition in which ice may form on a structure exposable to an impinging airflow, the method comprising: detecting the presence of water on the surface of a structure exposable to an impinging airflow according to any above the above features; detecting an air temperature of the environment external to the structure; detecting an icing condition dependent on the detection of the presence of water on the surface of the structure and the air temperature being substantially at or below 10° C. The method may also comprise generating a warning signal displayable to a user in response to an icing condition being detected. The method may further comprise controlling an ice protection system in response to an icing condition being detected, the ice protection system comprising the heaters, and the system being controlled to heat the temperature of the surface at the respective regions associated with the respective heaters so as to remove water or ice from the surface of the structure.

We also describe apparatus for detecting the presence of water or ice on a surface of a structure, the structure having a surface exposable to an impinging airflow, the apparatus comprising: a plurality of heaters coupleable to the structure exposable to an impinging airflow, the plurality of heaters being arranged adjacent one another from a region of a leading edge of the structure and extending aft of the leading edge of the structure; a plurality of temperature sensors each thermally coupled to a respective heater for sensing the temperature of the respective heater and for outputting a respective temperature signal; a controller coupled to the heaters and the temperature sensors, for controllably applying power to the respective heaters and for receiving the respective temperature signals, the controller being configured to: supply each of the respective heaters with a respective power, each of the respective powers being sufficient to heat a surface of the structure at each of the respective regions associated with the respective heaters to substantially the same surface temperature; sense a first power being supplied to a first heater and sensing a power being supplied to a second heater, the first heater being aft of the fore-most heater, and the second heater being fore of the aft-most heater; compare the first and second powers consumed by the respective first and second heaters; and detect the presence of water or ice on the surface of the structure based on the comparison of the first and second powers consumed by the respective first and second heaters, wherein water or ice is detected when the power consumed by the first heater is different to the power consumed by the second heater.

Water or ice may be detected when the power consumed by the first heater is greater than the power consumed by the second heater, or when the power consumed by the second heater is greater than the power consumed by the first heater.

The controller may be configured to calculate a surface temperature, by: measuring a temperature of a respective heater; and calculating the surface temperature from the temperature of the heater, the power applied to the heater, and at least one thermal resistance between the heater and the surface of the structure.

The controller may be further configured to: measure a temperature of a respective heater; and control the power applied to the respective heater using the measured temperature of the heater.

The controller may control the respective power applied to the respective heater such that the surface temperature is sufficient to cause evaporation of water or ice in contact with the surface of the structure at the respective region.

The controller may further be configured to identify a region aft of the first heater having water or ice thereon by: sensing the power being supplied to a heater aft of the first heater; comparing the power being consumed to the heater aft of the first heater with the second power consumed by the respective second heater; and detecting the presence of water or ice on the surface of the structure based on the comparison of the respective powers consumed by the respective heater aft of the first heater and the second heater, wherein water or ice is detected when the power consumed by the heater aft of the first heater is different to the power consumed by the second heater.

The controller may be configured to detect water or ice when the power consumed by the respective heater aft of the first heater is greater than the power consumed by the second heater, or when the power consumed by the second heater is greater than the power consumed by the respective heater aft of the first heater. The controller may be configured to receive an Angle of Attack (AoA) of the structure, and wherein the heater aft of the first heater is dependent on the AoA.

The surface temperature may be heated by a respective heater to greater than or equal to 50° C. above a temperature of the environment to which the structure is exposed.

The controller may further be configured to generate a warning signal displayable to a user in response to water or ice being detected.

The controller may further be configured to control an ice protection system in response to an icing condition being detected, the ice protection system comprising the heaters, and the system being controlled to heat the temperature of the surface at the respective regions associated with the respective heaters so as to remove water or ice from the surface of the structure.

We also describe apparatus for detecting an icing condition in which ice may form on a structure exposable to an impinging airflow, the apparatus comprising: apparatus for detecting the presence of water on the surface of a structure exposable to an impinging airflow according to the apparatus described above; and a temperature sensor for detecting an air temperature of the environment external to the structure, wherein the controller is configured to detect an icing condition dependent on the detection of the presence of water on the surface of the structure and the air temperature being substantially at or below 10° C.

The controller may be configured to generate a warning signal displayable to a user in response to an icing condition being detected.

The controller may be configured to controlling an ice protection system in response to an icing condition being detected, the ice protection system comprising the heaters, and the system being controlled to heat the temperature of the surface at the respective regions associated with the respective heaters so as to remove water or ice from the surface of the structure.

The heaters may be disposed in a layer of the structure between the temperature sensor and a surface of the structure.

The temperature sensors may be disposed in a layer between the respective heaters and a surface of the structure.

We also describe a controller for detecting the presence of water or ice on a surface of a structure, the structure having a surface exposable to an impinging airflow, and the structure having a plurality of heaters in thermal contact therewith, the plurality of heaters being arranged adjacent one another from a region of a leading edge of the structure and extending aft of the leading edge of the structure, the controller comprising: a plurality of outputs each being adapted to supply power respectively to a heater from the plurality of heaters, the plurality of heaters being thermally coupleable to a region of the structure exposable to an impinging airflow; and a plurality of inputs each being adapted to receive a temperature sensor signal from a respective temperature sensor, each of a plurality of temperature sensors being thermally coupleable to a respective heater for sensing the temperature of the respective heater; the controller being configured to: supply each of the respective heaters with a respective power, each of the respective powers being sufficient to heat a surface of the structure at each of the respective regions associated with the respective heaters to substantially the same surface temperature; sense a first power being supplied to a first heater and sensing a power being supplied to a second heater, the first heater being aft of the fore-most heater, and the second heater being fore of the aft-most heater; compare the first and second powers consumed by the respective first and second heaters; and detect the presence of water or ice on the surface of the structure based on the comparison of the first and second powers consumed by the respective first and second heaters, wherein water or ice is detected when the power consumed by the first heater is different to the power consumed by the second heater.

Water or ice may be detected when the power consumed by the first heater is greater than the power consumed by the second heater, or when the power consumed by the second heater is greater than the power consumed by the first heater.

The controller may be configured to calculate the surface temperature by: receiving the respective temperature sensor signal; and calculating the surface temperature from the respective temperature sensor signal, the power applied to the respective heater, and at least one thermal resistance between the respective heater and the surface of the structure.

The controller may be configured to control the power applied to the respective heater using the respective temperature signal.

The respective power applied to the respective heater may be sufficient to cause evaporation of water or ice in contact with the surface of the structure at the respective region.

The surface temperature may be greater than or equal to 50° C. above a temperature of the environment to which the structure is exposed.

The controller may be further configured to identify a region aft of the first heater having water or ice thereon by: sensing the power being supplied to a heater aft of the first heater; comparing the power being consumed to the heater aft of the first heater with the second power consumed by the respective second heater; and detecting the presence of water or ice on the surface of the structure based on the comparison of the respective powers consumed by the respective heater aft of the first heater and the second heater, wherein water or ice is detected when the power consumed by the heater aft of the first heater is different to the power consumed by the second heater.

The controller may be configured to detect water or ice when the power consumed by the respective heater aft of the first heater is greater than the power consumed by the second heater, or when the power consumed by the second heater is greater than the power consumed by the respective heater aft of the first heater.

6

The controller may be configured to receive an Angle of Attack (AoA) of the structure, and wherein the heater aft of the first heater is dependent on the AoA.

The controller may be further configured to generate a warning signal displayable to a user in response to water or ice being detected.

The controller may be further configured to control an ice protection system in response to an icing condition being detected, the ice protection system comprising the heaters, and the system being controlled to heat the temperature of the surface at the respective regions associated with the respective heaters so as to remove water or ice from the surface of the structure.

We also describe a controller for detecting an icing condition in which ice may form on a structure exposable to an impinging airflow, the controller comprising: a controller for detecting the presence of water on the surface of a structure exposable to an impinging airflow according to the above controllers; and a temperature sensor for detecting an air temperature of the environment external to the structure, the temperature sensor being coupled to the controller for providing the controller with a temperature signal, herein the controller is configured to detect an icing condition dependent on the detection of the presence of water on the surface of the structure and the air temperature being substantially at or below 10° C. The controller may be configured to generate a warning signal displayable to a user in response to an icing condition being detected.

The controller may be configured to control an ice protection system in response to an icing condition being detected, the ice protection system comprising the heaters, and the system being controlled to heat the temperature of the surface at the respective regions associated with the respective heaters so as to remove water or ice from the surface of the structure.

The heaters may be disposed in a layer of the structure between the temperature sensor and a surface of the structure.

The temperature sensors may be disposed in a layer between the respective heaters and a surface of the structure.

LIST OF FIGURES

The invention will now be described, by way of example only with reference to the accompanying figures, in which.

Figure 1:
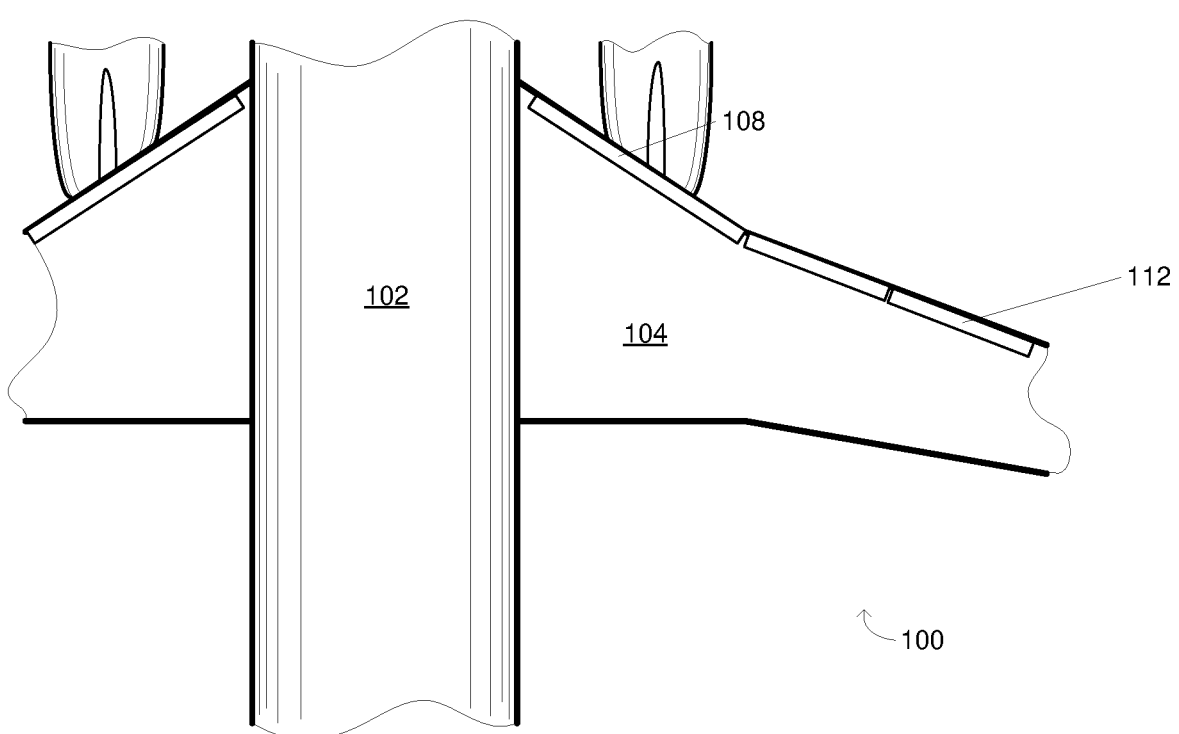
FIG. 1 is an illustration of a portion of an aircraft.

DETAILED DESCRIPTION OF THE
PREFERRED EMBODIMENTS

In brief, the present invention uses a plurality of heaters thermally coupled to a structure (for example on the back of a wing) in order to detect the presence of water or ice on the structure. The heaters are arranged adjacent one another from a region of a leading edge of the structure (that is exposable to an impinging airflow) and extending aft of the leading edge of the structure. The heaters, which may be controlled individually, are supplied power that is sufficient to heat the surface of the structure to substantially the same temperature. A controller senses the power required for the heaters to achieve the same surface temperature at the respective regions. By comparing the power consumed by a heater that is aft of the fore-most heater, and the power consumed by a heater fore of the aft-most heater, a determination of the presence of water or ice can be made if the power consumed by the heater that is aft of the fore-most heater is different to the power consumed by the heater that is fore of the aft-most heater. Generally speaking, if the power consumed by the first heater is greater than the power consumed by the second heater, then it is indicative of the presence of ice or water at surface of the structure associated with the first heater. If the power consumed by the second heater is greater than the power consumed by the first heater, then this is indicative of the presence of water or ice on the surface of the structure associated with the first heater.

We shall first discuss ice protection systems in general. Ice protection systems protect against the build-up of ice on structures. One common application of ice protection systems is on aircraft. During flight, the surfaces of an aircraft can be exposed to water at low temperatures and, if no preventative action is taken, ice can quickly form on the wings, on control surfaces, and on other parts of the aircraft in such a way as to alter the aerodynamic performance of the aircraft (for example by altering the airflow around the aircraft and by adding additional weight to it) with potentially catastrophic consequences. Example ice protection systems are discussed in the following patents and applications in the name of Ultra Electronics Limited® (the content of which are hereby incorporated in their entirety by reference): U.S. Pat. No. 7,580,777, WO2008/145985, US20090149997, US20090230239 and US2010/0243811.

Electrothermal ice protection systems comprise a number of heater devices (such as heater mats), which can be used as anti-icing zones in which a sufficient temperature is maintained at the surface of the wing in order to prevent the formation of ice on and behind the protected zone. These heater devices can also be used as de-icing zones to shed ice that has been allowed to accrete on the protected region. The de-icing mats are cyclically energised in order to melt the interface between the wing and the accreted ice, causing the ice to be shed.

In such an ice protection system it is important to avoid overheating of the heater devices (heating mats) in order to avoid a failure either of the devices or in the structure to which the devices are attached. Many modern aircraft (and other structures) use composite materials, which can suffer damage (delamination of the material, for example) at a relatively low temperature. Temperature 'overshoot' of the heater devices must therefore be controlled whilst maintaining rapid heating of the protected surface(s).

Aircraft are normally subject to a range of different icing conditions during flight, such as different air temperatures, air velocities, relative humidity, and so on, which can depend for example on the location, altitude, orientation, air speed or pitch of the aircraft, the prevailing meteorological conditions, and so on. Different icing conditions can determine not only the temperatures and velocities (and so on) at which ice will form on different parts of the aircraft structure, but also the heat loss from the aircraft structure.

FIG. 1 is an illustration of a portion of an aircraft, showing the placement of heater mats of an ice protection system of an aircraft. The aircraft 100 includes a fuselage portion 102 and a wing portion 104. On the leading edge 106 of the wing 104 are provided a plurality of heating mats.

Each heater mat is divided into a number of heater zones. The number and size of the heater zones are chosen to suit a particular safety model, for example such that up to two heater zones can fail without causing a hazardous or catastrophic failure of the aircraft. In one aircraft design, safety requirements require each heater mat to be divided into six separate heater zones.

However, ice protection systems are known for being power-hungry systems, which can be a burden to the power generation and distribution systems in aircraft. It is sometimes therefore desirable only to use the ice protection systems as and when needed, rather than all the time. There thus remains a need to detect when water or ice is impinging on, or sticking to, the surface of a structure. Once the presence of water and/or ice has been detected, the ice protection systems can be activated.

Figure 2:
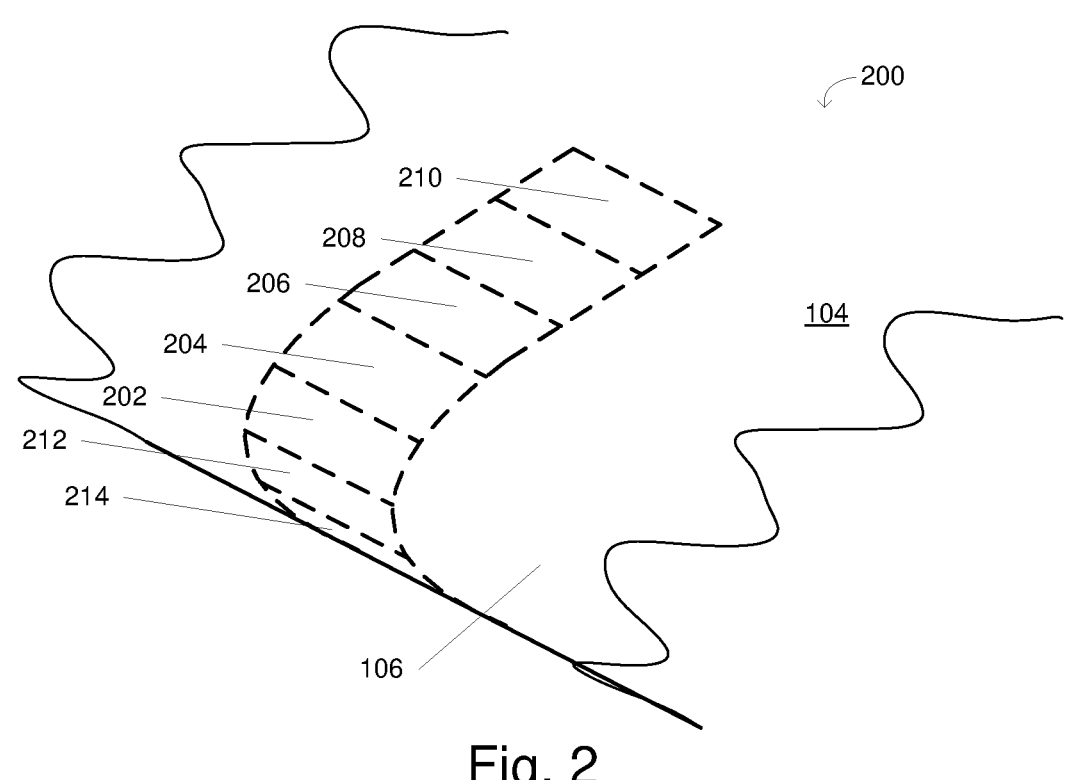
FIG. 2 is an illustration of a portion of the leading edge of an aircraft wing comprising a plurality of heated regions.

FIG. 2 is an illustration of a portion of the leading edge of an aircraft wing 104 comprising a plurality of heaters 202, 204, 206, 208, 210, 212, 214, which form part of the present invention. The heaters are located under the surface (hence shown dashed) of the wing, but are in thermal contact with the surface of the wing. Seven heaters (not to scale) are shown in this figure, although it would be clear to the skilled reader that there could be more or fewer regions than indicated. The heaters 202 to 214 are arranged such that a heater 202 is located on the leading edge of the structure 104, with heaters 204, 206, 208, 210 running aft of the heater 202 on an upper surface of the structure 104 in a direction of the airflow that would impinge on the surface. Other heaters 212 and 214 are arranged aft of and beneath the structure in a direction of the airflow that would impinge on the surface.

Figure 3:
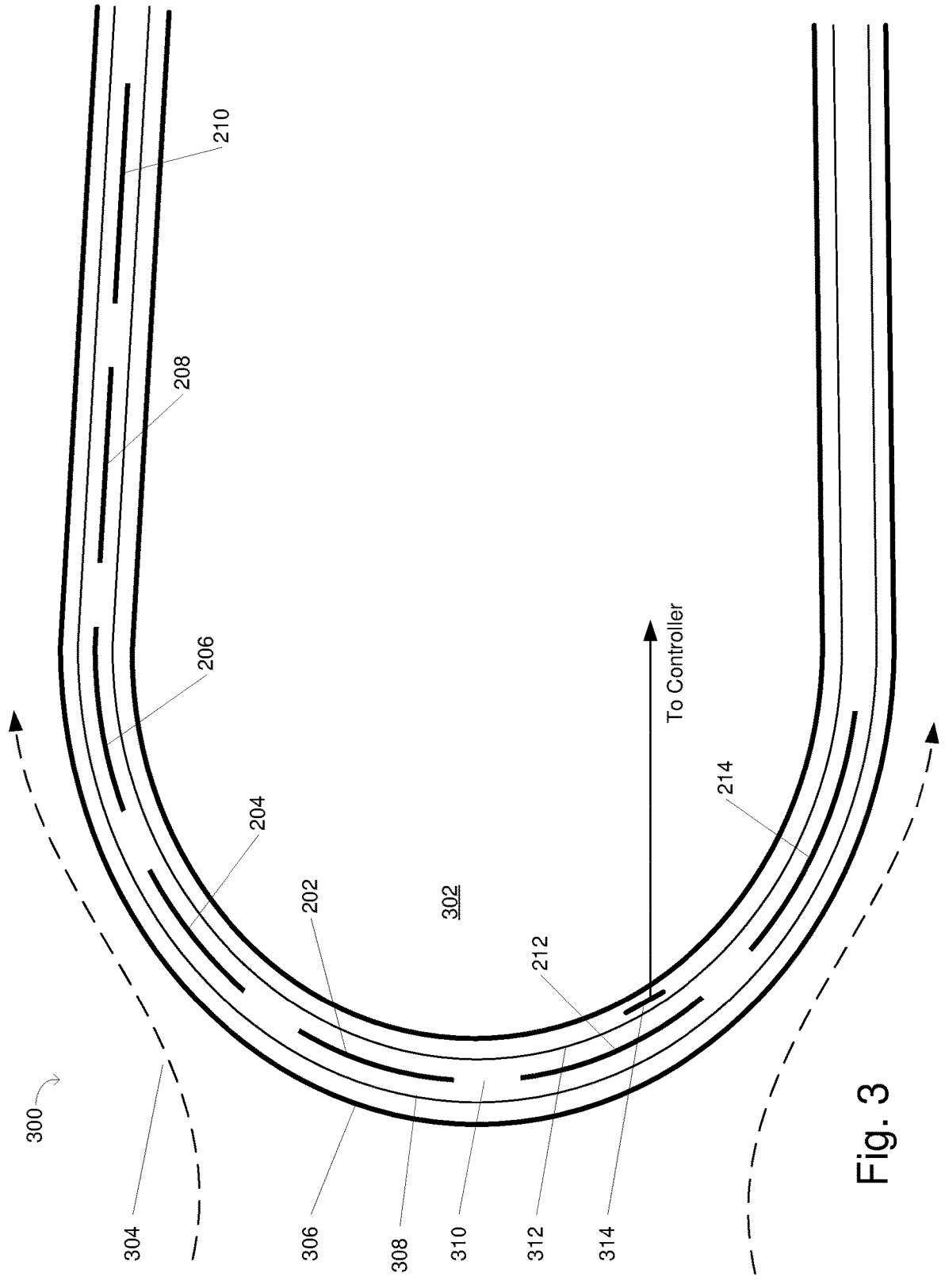
FIG. 3 is a cross-section of the structure of an aircraft wing section.

FIG. 3 is a cross-section 300 of the structure of an aircraft wing section. The figure shows the leading edge 302 of the wing in cross-section and an approximation of the airflow 304 over the wing whilst in flight. The wing includes an erosion shield 306, typically a stiff, erosion-resistant aluminium shield, a dielectric (insulator) 308, a heater layer 310 (in which the heaters 202 to 214 are located), another dielectric 312, and a temperature sensor 314. Only one temperature sensor is shown for clarity, although each heater 202 to 214 is in thermal contact with its own temperature sensor). The layers 306, 308, 310, 312 are much thinner than as shown, forming a thin sandwich at the edge of the wing section.

The main wing section 302 is formed from any appropriate material, such as composite materials that comprise a plurality of layers of stiff material bound together with glue. Composite materials have a good ratio of strength to weight, but are susceptible to failure by delamination (when the glue melts) at a relatively low temperature. Therefore care needs to be taken to avoid 'overshoot' (overheating) of the heater.

Figure 6:
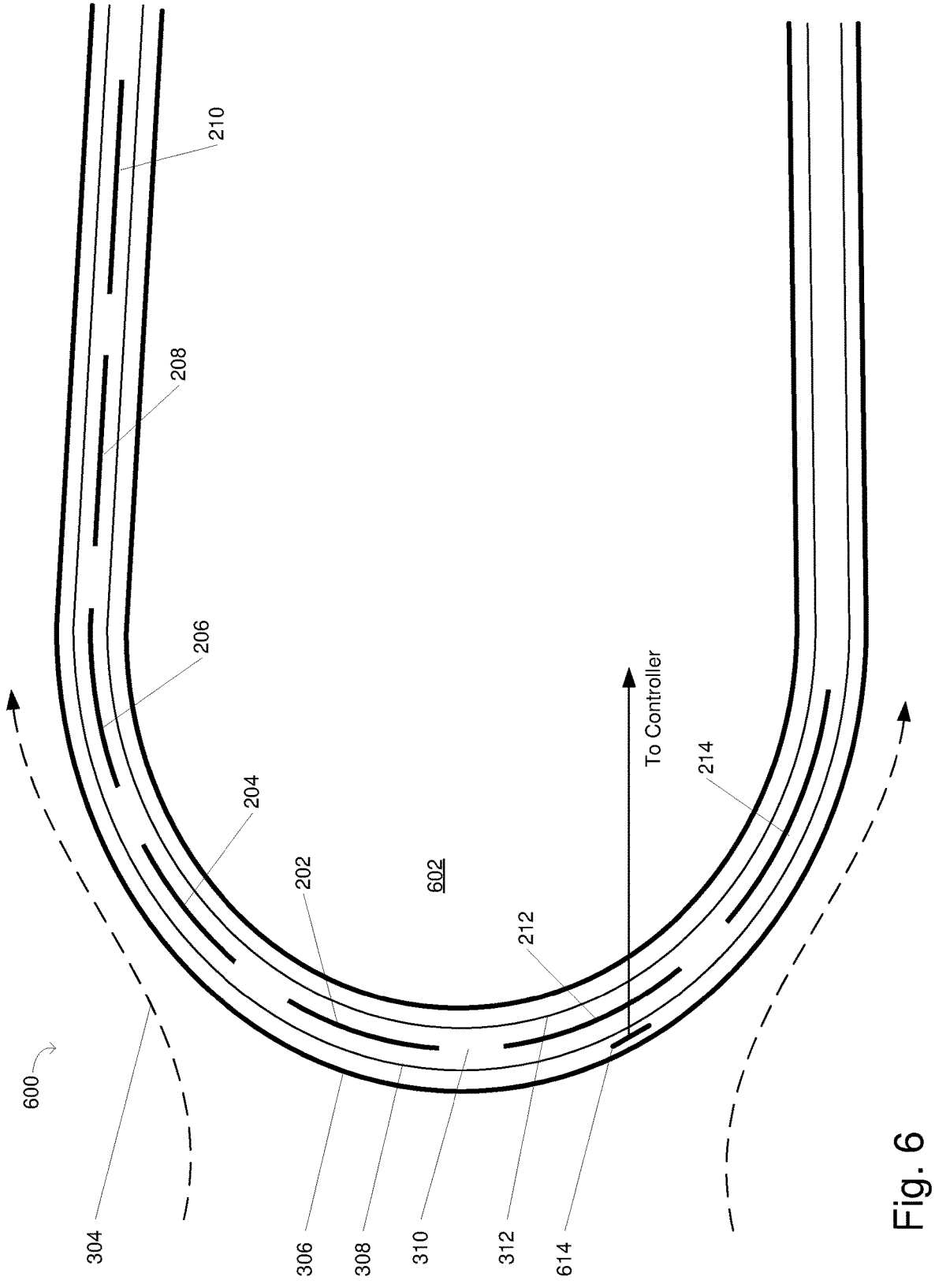
FIG. 6 is a cross-section of the structure of an aircraft wing section in an alternative arrangement.

It will be appreciated that a similar arrangement may be provided on other exposed parts of the aircraft structure (such as on propeller leading edges or on engine inlets, for example). It will also be appreciated that the temperature sensor 314 may be located between the heater layer 310 and the erosion shield 306, as shown in FIG. 6 (discussed below).

Figures 4, 5:
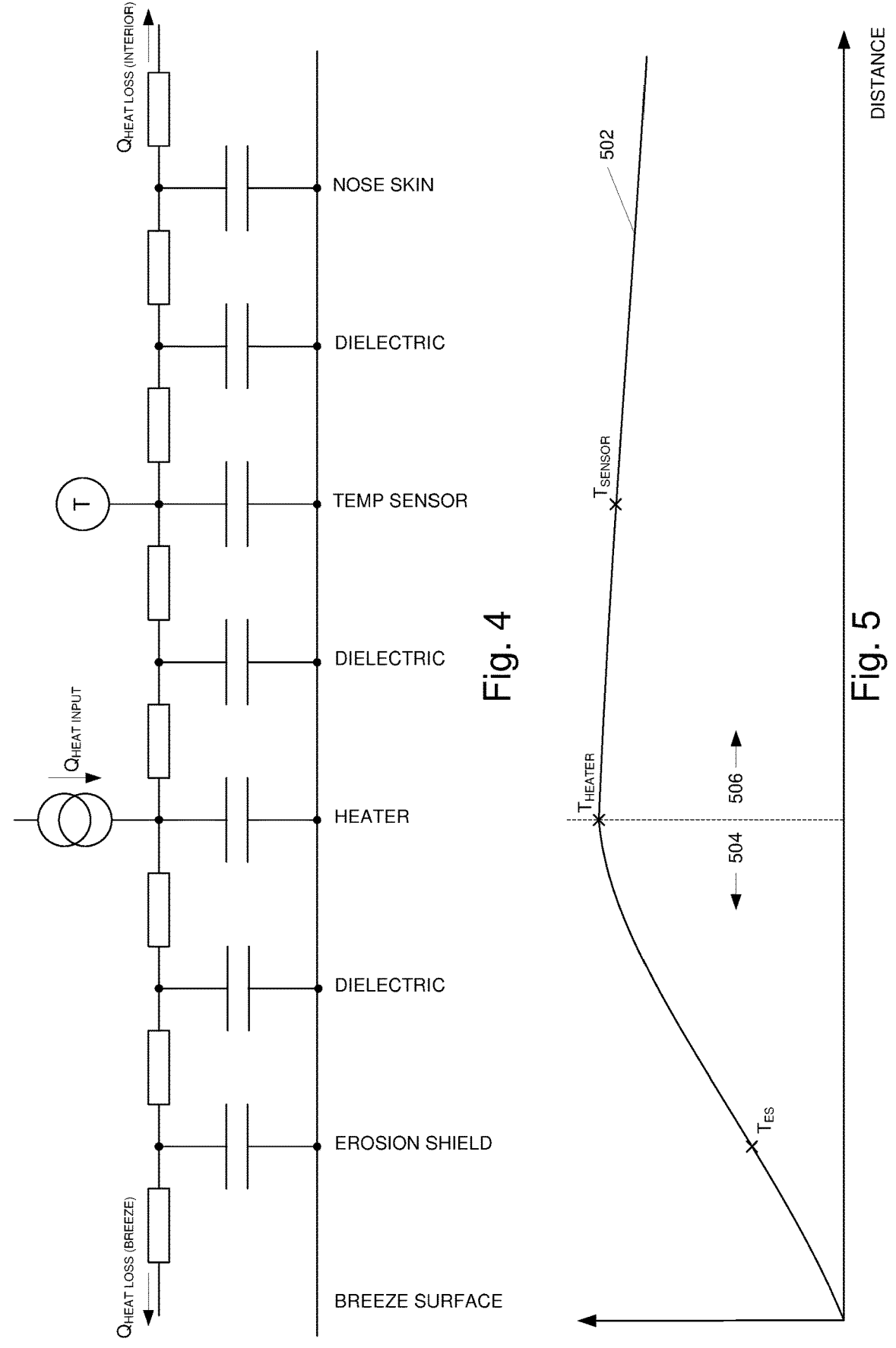
FIG. 4 is an illustration of thermal resistances and thermal capacitances of the wing section of FIG. 3.
FIG. 5 is a graph illustrating the variation of temperature over distance within the wing section of FIG. 3.

FIG. 4 is an illustration of thermal resistances and thermal capacitances of the wing section of FIG. 3.

The thermal resistances (degree of thermal insulation) and thermal capacitances (heat capacity) are illustrated using electrical equivalents, with heat flow corresponding to electrical current and temperatures corresponding to voltages. In this representation, the heat generated by the heater mat is represented by a current source $Q_{HEAT\ INPUT}$ and the temperature sensor 314 of FIG. 3 is represented as a voltage measurement. Each of the layers has an associated thermal capacity (which may be negligible) and the thermal resistance of each layer is also shown. The heat loss at the breeze surface (the interface with the air impinging on the wing), $Q_{HEAT\ LOSS\ (BREEZE)}$, and the heat loss into the interior of the wing, $Q_{HEAT\ LOSS\ (INTERIOR)}$, are also indicated (as currents flowing out of the thermal circuit). The heat loss $Q_{HEAT\ LOSS\ (INTERIOR)}$ into the interior of the structure is considerably less than the heat loss $Q_{HEAT\ LOSS\ (BREEZE)}$ through the erosion shield (by design).

The thermal properties of the wing section during normal ice protection or detection conditions (during flight) will now be described in more detail.

FIG. 5 is a graph illustrating the variation of temperature over distance within the wing section of FIG. 3. The temperature 502 is plotted from the left hand side 504, where large amounts of heat flow through the erosion shield, to the right hand side 506, where heat is slowly lost into the wing structure. The gradient of the curve 502 is equivalent to the thermal gradient (although not drawn to scale).

The heater Temperature $T_{HEATER}$, the temperature sensor temperature $T_{SENSOR}$ and the erosion shield temperature $T_{ES}$ are indicated on the temperature curve 502. The temperature sensor temperature $T_{SENSOR}$ is approximately equal to the heater Temperature $T_{HEATER}$ because of the shallow thermal gradient flowing into the structure 506. The erosion shield temperature $T_{ES}$ is quite different, however, because of the steep temperature gradient flowing out of the wing 504. In accordance with the electrical analogy in FIG. 5, the temperature T is substitutable for a voltage, and a corresponding current can be derived from the gradient of the curve 502.

As such, the temperature of the surface can be determined from the known properties of the component parts of the surface, the known amount of power supplied to the heater, and from a measurement of the temperature sensor adjacent the heater.

FIG. 6 is a cross-section of the structure of an aircraft wing section in an alternative arrangement to that shown in FIG. 3. In FIG. 6, the temperature sensor 614 is located between the heater layer 310 and the erosion shield 306, as shown in FIG. 6. Again, only one temperature sensor 614 is shown. Preferably each heater 202 to 214 is in thermal contact with a respective temperature sensor.

Figures 7, 8:
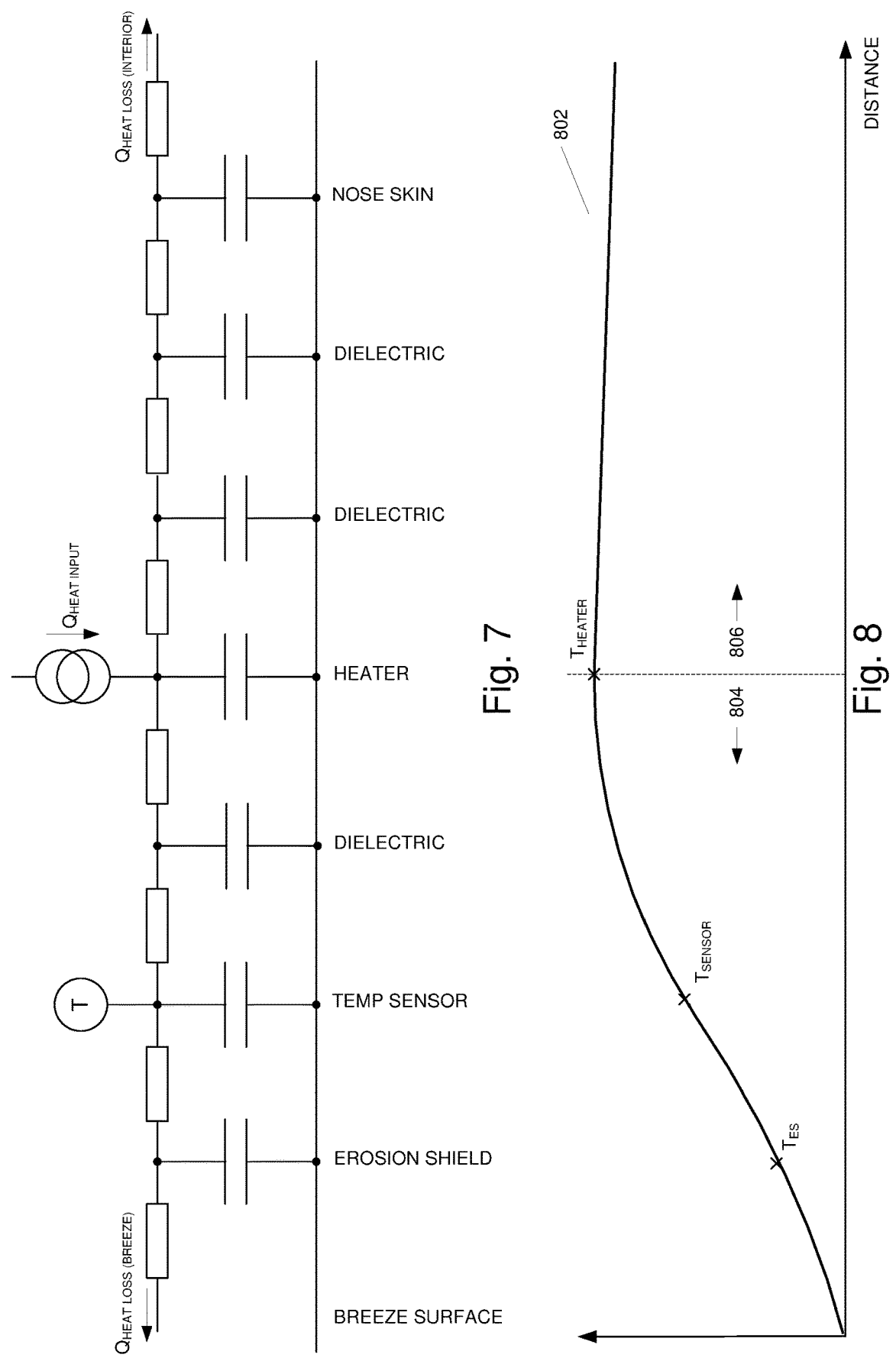
FIG. 7 is an illustration of thermal resistances and thermal capacitances of the wing section of FIG. 6.
FIG. 8 is a graph illustrating the variation of temperature over distance within the wing section of FIG. 6.

FIG. 7 is an illustration of thermal resistances and thermal capacitances of the wing section of FIG. 6. The principles remain the same as in FIG. 4, although it should be noted that the Temperature Sensor is now between the heater and the erosion shield.

Similarly, FIG. 8 shows a graph illustrating the variation of temperature over distance within the wing section of FIG. 6. The temperature 802 is plotted from the left hand side 804, where large amounts of heat flow through the erosion shield, to the right hand side 806, where heat is slowly lost into the wing structure. The gradient of the curve 802 is equivalent to the thermal gradient (although not drawn to scale).

The heater Temperature $T_{HEATER}$, the temperature sensor temperature $T_{SENSOR}$ and the erosion shield temperature $T_{ES}$ are indicated on the temperature curve 802. Since the temperature sensor $T_{SENSOR}$ is located between the heater layer and the erosion shield, the temperature of the temperature sensor $T_{SENSOR}$ is quite different to the heater Temperature $T_{HEATER}$ due to the steep temperature gradient flowing out of the wing 804. Similarly, the erosion shield temperature $T_{ES}$ is quite different because of the steep temperature gradient flowing out of the wing 804. In accordance with the electrical analogy in FIG. 7, the temperature T is substitutable for a voltage, and a corresponding current can be derived from the gradient of the curve 802.

As such, the temperature of the surface can be determined from the known properties of the component parts of the surface, the known amount of power supplied to the heater, and from a measurement of the temperature sensor.

The method of detecting the presence of water or ice on a surface of a structure (for example the wing structure described above) will now be described.

As well as each of the heaters 202 to 214 being in thermal contact with the surface of the structure (each heater therefore heats a respective region of the surface of the structure), each of the heaters 202 to 214 is electrically coupled to a controller for controllably supplying power to each of the heaters. The controller receives temperature sensor signals from each of the temperature sensors (each temperature sensor being thermally coupled to a respective heater. As such, the temperature sensor provides a measure of the heated region close to the heater, which is indicative of the heater temperature, and the surface temperature of the structure may be inferred or calculated as described above).

Each of the heaters 202 to 214 is supplied with a respective power. The powers are sufficient to heat the surface of the structure at each of the respective regions associated with the respective heaters to substantially the same surface temperature across all heaters. A controller monitors the signals from the respective temperature sensors and either controls the power supplied to each of the heaters to achieve a certain heater temperature (as indicated by the signal from the temperature sensor), or, as discussed above, based on the inferred surface temperature.

The controller senses the power being supplied to each of the heaters, along with the signal from the temperature sensor. Based on the power required to heat certain heaters to the desired temperature, the presence of water or ice on the surface of the structure can be inferred.

The prevailing environmental conditions (for example temperature and or/windspeed) is the same for all of the heaters 202 to 214. However, if water is impinging on the leading edge of the structure, the same amount of water is unlikely also to impinge on the subsequent heaters. This is because the water landing on the surface of the structure is heated by the heater mats. As such, water impinging on the leading edge is heated, travels along a distance of the surface (driven by the prevailing conditions) whilst being further heated and being caused to evaporate from the surface.

The heaters in the region of the impingement zone (i.e. the region of the surface being impinged by the environment) will therefore be in a wetter condition that heaters further aft of the impingement zone. In some situations, the trailing heaters may even be considered to be in a dry air condition.

Therefore, the power required to heat the heaters 202 to 214 will therefore vary along the strip of heaters, with the controller being required to supply more power to heat the heaters in the wetter conditions than those in the drier air conditions.

In practice, the heaters chosen to compare power requirements depend on the position of the impingement of the environment onto the structure, which can be determined for example by a measure of the Angle of Attack (AoA) of the structure. Due to the possibility of heat leakage into the surrounding structure affecting the relative power required to heat the first (214) and last (210) heater mats to the required surface temperature, the heater aft (202, 212) of the fore-most heater (214), and the heater fore (208) of the aft-most (210) heaters may be chosen as the heaters used in the power comparison.

Other heaters in the strip may be chosen, for example any of heaters 212, 202, 204, 206, and 208 would be suitable.

Detecting the presence of water or ice on the surface of the structure is thus based on the comparison of the powers required to heat the respective heaters (202, 212, 208) to the same surface temperature (as indicated from the temperature sensor signal). When water (or ice) is present on the surface, the power required to heat the chosen heater at the fore of the strip will be different to the power required to heat the heater at the aft of the strip.

Generally speaking, if the power consumed by the first heater is greater than the power consumed by the second heater, then it is indicative of the presence of ice or water at surface of the structure associated with the first heater. This is due to the first heater consuming more power due to the heat losses associated with the water or ice on the surface.

However, if, on the other hand, the power consumed by the second heater is greater than the power consumed by the first heater, then this is also indicative of the presence of water or ice on the surface of the structure associated with the first heater. If an ice cap has already formed on the structure in the region associated with the first heater, the ice cap forms an insulating layer (from the prevailing environment) over that area of the structure. As such, the power required to heat that area of the surface of the structure will be much less than in other areas where water or ice is impinging, or in other regions where they may be considered "dry".

Preferably, the respective powers applied to the respective heaters are controlled such that the surface temperature is sufficient to cause evaporation of water or ice in contact with the surface of the structure at the respective region. This may be greater than or equal to 50° C. above a temperature of the environment to which the structure is exposed, or it may be a different temperature, depending on the prevailing conditions.

The set surface temperature is preferably set as high as possible to:

maximize surface water evaporation (minimizing runback); and minimize the effect of measurement errors However, the value of set surface temperature is limited by:

the maximum temperature to which any part of the wing or heater assembly can be taken to without risk of failure (for example delamination)

the maximum power that may be drawn from the power supply (or an airplane-allocated power budget)

With regards to the surface temperature, the higher the difference between the heated surface temperature and the ambient temperature:

the greater the sensitivity to detecting low water concentrations;

the more accuracy in the determination of the impingement profile (see below).

Whilst the system will work for temperature differences of less than 50° C., the performance of the system may be less than optimal. There will be a temperature difference at which the system will not be fit for purpose, however this is not a fixed value, as it is dependent on ambient conditions, the accuracy of the external data the detector is receiving and the sensitivity of the structure to icing. As such, the preferred approach is to maintain the temperature difference as high as possible without compromising potential overheat conditions or exceeding power budgets. Where the system cannot maintain this difference, it will be in high water content conditions— which the system will correctly detect.

In practice, in dry or low water content conditions the system may maintain the leading edge heater temperature sensor in the region of 100° C. to 110° C. (dictated by overheat protection needs). Typically, the surface temperature would then be in the range 60° C. (high airspeed, high air density) to 80° C. (low airspeed, low air density). In high water content conditions the heater (and hence the surface) temperature would be allowed to drop because the total power consumption would become too high. As discussed above, in the case where there is high water content, this will be detected by the system.

As well as determining the presence or water or ice on the surface of the structure, the present invention may also determine the level of impingement, that is, how far along the structure the water is impinging onto the surface. From sensing the power required to drive each of the heaters to the desired temperature, one would be able to see a power profile from heater 202 to 210, and also from heater 202 to 212 and 214. Differences in the power required to drive each of the heaters to the desired temperature would indicate how far along the strip the water or ice impinges on the surface, since areas of impingement would require a greater power supplied to the heater when compared to heaters outside of the impingement.

Supercooled Large Droplet (SLD) conditions (FAA Regulations, Appendix O) impinge much further aft than 'normal icing' conditions (Appendix C). As such, the present invention may be used to identify SLDs impinging on the surface easily, and provide a suitable indication. If the measure of how far back the impingement occurs exceeds a limit (corresponding to the limit beyond which the wing surface is protected) then an indication that ice accretion is occurring in an unprotected area can be generated. Such a limit can for example be dependent on the distance or number of regions aft of the leading edge region.

In any of the above determinations, an indication of the Angle of Attack (AoA) may be used, since the AoA of the structure will be indicative of where on the structure an impingement limit will be (and thus the associated heaters).

Once a determination of the presence of water or ice impinging on the surface of a structure has been made, a number of outcomes are possible.

A warning signal may be generated and displayed to a user in response to the water or ice being detected. For example in the case of an aircraft, the pilot may be alerted to the fact that the system has detected water or ice impingement. The user may then make a decision of whether or not to activate a de-icing or anti-icing system, or, in the case of an aircraft, the user may want to move the aircraft out of the prevailing conditions (for example drop to a lower altitude).

The determination may also be used in an automated de-icing or anti-icing system (for example an ice protection system), in which, in response to an icing condition being detected, the ice protection system may be controlled to heat the temperature of the surface at the respective regions associated with the respective heaters so as to remove water or ice from the surface of the structure.

The ice protection system may in fact comprise the heater mats used in the present invention. That is, the heater mats ordinarily used in an ice protection system (such as a de-icing or anti-icing system) may be used to determine the presence of water or ice on the surface of the structure using the present invention, and then the present invention controls the ice protection system in order to clear the surface of water or ice from the surface.

The present invention may also be used to detect an icing condition in which ice may form on a structure. In this way, the above methods are carried out to detect the presence of water or ice on the structure. Combined with a knowledge of the prevailing environmental conditions (for example a temperature sensor measuring the temperature of the environment external to the structure being substantially at or below 10° C.), a determination of whether or not the structure is in an icing condition may be made.

As with the above methods, a determination of an icing condition may be used to generate a warning (as described above) or control an ice protection system (as described above).

Although the present invention has been described hereinabove with reference to specific embodiments, the present invention is not limited to the specific embodiments and modifications will be apparent to a skilled person in the art which lie within the scope of the claims. Any of the embodiments described hereinabove can be used in any combination with one or more of the other embodiments.

The invention claimed is:

1. A method of detecting the presence of water or ice on a surface of a structure, the structure having a surface exposable to an impinging airflow, the method comprising the steps of:

supplying each of a plurality of heaters with a respective power, the plurality of heaters being in thermal contact with the structure and arranged adjacent one another from a region of a leading edge of the structure and extending aft of the leading edge of the structure, each of the respective powers being sufficient to heat a surface of the structure at each of the respective regions associated with the respective heaters to substantially the same surface temperature;

sensing a first power being supplied to a first heater and sensing a second power being supplied to a second heater, the first heater being aft of the fore-most heater, and the second heater being fore of the aft-most heater;

comparing the first and second powers consumed by the respective first and second heaters;

detecting the presence of water or ice on the surface of the structure based on the comparison of the first and second powers consumed by the respective first and second heaters, wherein water or ice is detected when the power consumed by the first heater is different to the power consumed by the second heater.

2. The method according to claim 1, wherein water or ice is detected when the power consumed by the first heater is greater than the power consumed by the second heater, or when the power consumed by the second heater is greater than the power consumed by the first heater.

3. The method according to claim 1, comprising calculating a surface temperature, comprising:

measuring a temperature of a respective heater of the plurality of heaters; and calculating the surface temperature from the temperature of the respective heater, the power applied to the respective heater, and at least one thermal resistance between the respective heater and the surface of the structure.

4. The method according to claim 1, further comprising:

measuring a temperature of a respective heater of the plurality of heaters; and controlling the power applied to the respective heater using the measured temperature of the heater.

5. The method according to claim 1, wherein the respective power applied to the respective heater is controlled such that the surface temperature is sufficient to cause evaporation of water or ice in contact with the surface of the structure at the respective region.

6. The method according to claim 1, further comprising identifying a region aft of the first heater having water or ice thereon by:

sensing the power being supplied to a heater aft of the first heater;

comparing the power being consumed to the heater aft of the first heater with the second power consumed by the respective second heater; and detecting the presence of water or ice on the surface of the structure based on the comparison of the respective powers consumed by the respective heater aft of the first heater and the second heater, wherein water or ice is detected when the power consumed by the heater aft of the first heater is different than the power consumed by the second heater.

7. The method according to claim 6, wherein water or ice is detected when the power consumed by the respective heater aft of the first heater is greater than the power consumed by the second heater, or when the power consumed by the second heater is greater than the power consumed by the respective heater aft of the first heater.

8. A method of detecting an icing condition in which ice may form on a structure exposable to an impinging airflow, the method comprising:

detecting the presence of water on the surface of a structure exposable to an impinging airflow according to claim 1;

detecting an air temperature of the environment external to the structure;

detecting an icing condition dependent on the detection of the presence of water on the surface of the structure and the air temperature being substantially at or below 10° C.

9. Apparatus for detecting the presence of water or ice on a surface of a structure, the structure having a surface exposable to an impinging airflow, the apparatus comprising:

a plurality of heaters coupleable to the structure exposable to an impinging airflow, the plurality of heaters being arranged adjacent one another from a region of a leading edge of the structure and extending aft of the leading edge of the structure;

a plurality of temperature sensors each thermally coupled to a respective heater of the plurality of heaters for sensing the temperature of the respective heater and for outputting a respective temperature signal;

a controller coupled to the heaters and the temperature sensors, for controllably applying power to the respective heaters and for receiving the respective temperature signals, the controller being configured to:

supply each of the respective heaters with a respective power, each of the respective powers being sufficient to heat a surface of the structure at each of the respective regions associated with the respective heaters to substantially the same surface temperature;

sense a first power being supplied to a first heater and sensing a second power being supplied to a second heater, the first heater being aft of the fore-most heater, and the second heater being fore of the aft-most heater;

compare the first and second powers consumed by the respective first and second heaters; and detect the presence of water or ice on the surface of the structure based on the comparison of the first and second powers consumed by the respective first and second heaters, wherein water or ice is detected when the power consumed by the first heater is different to the power consumed by the second heater.

10. The apparatus according to claim 9, wherein water or ice is detected when the power consumed by the first heater is greater than the power consumed by the second heater, or when the power consumed by the second heater is greater than the power consumed by the first heater.

11. The apparatus according to claim 9, wherein the controller is configured to calculate a surface temperature, by:

measuring a temperature of the respective heater; and calculating the surface temperature from the temperature of the respective heater, the respective power applied to the respective heater, and at least one thermal resistance between the respective heater and the surface of the structure.

12. The apparatus according to claim 9, wherein the controller is further configured to:

measure a temperature of the respective heater; and control the respective power applied to the respective heater using the measured temperature of the respective heater.

13. The apparatus according to claim 9, wherein the controller controls the respective power applied to the respective heater such that the surface temperature is sufficient to cause evaporation of water or ice in contact with the surface of the structure at the respective region.

14. The apparatus according to claim 9, wherein the controller is further configured to identify a region aft of the first heater having water or ice thereon by:

sensing the power being supplied to a heater aft of the first heater;

comparing the power being consumed to the heater aft of the first heater with the second power consumed by the respective second heater; and detecting the presence of water or ice on the surface of the structure based on the comparison of the respective powers consumed by the respective heater aft of the first heater and the second heater, wherein water or ice is detected when the power consumed by the heater aft of the first heater is different to the power consumed by the second heater.

15. The apparatus according to claim 14, wherein the controller is configured to detect water or ice when the power consumed by the respective heater aft of the first heater is greater than the power consumed by the second heater, or when the power consumed by the second heater is greater than the power consumed by the respective heater aft of the first heater.

16. Apparatus for detecting an icing condition in which ice may form on a structure exposable to an impinging airflow, the apparatus comprising:

apparatus for detecting the presence of water on the surface of a structure exposable to an impinging airflow according to claim 9; and a temperature sensor for detecting an air temperature of the environment external to the structure, wherein the controller is configured to detect an icing condition dependent on the detection of the presence of water on the surface of the structure and the air temperature being substantially at or below 10° C.

17. A controller for detecting the presence of water or ice on a surface of a structure, the structure having a surface exposable to an impinging airflow, and the structure having a plurality of heaters in thermal contact therewith, the plurality of heaters being arranged adjacent one another from a region of a leading edge of the structure and extending aft of the leading edge of the structure, the controller comprising:

a plurality of outputs each being adapted to supply power respectively to a heater from the plurality of heaters, the plurality of heaters being thermally coupleable to a region of the structure exposable to an impinging airflow; and a plurality of inputs each being adapted to receive a temperature sensor signal from a respective temperature sensor, each of a plurality of temperature sensors being thermally coupleable to a respective heater of the plurality of heaters for sensing the temperature of the respective heater;

the controller being configured to:

supply each of the respective heaters with a respective power, each of the respective powers being sufficient to heat a surface of the structure at each of the respective regions associated with the respective heaters to substantially the same surface temperature;

sense a first power being supplied to a first heater and sense a second power being supplied to a second heater, the first heater being aft of the fore-most heater, and the second heater being fore of the aft-most heater;

compare the first and second powers consumed by the respective first and second heaters; and detect the presence of water or ice on the surface of the structure based on the comparison of the first and second powers consumed by the respective first and second heaters, wherein water or ice is detected when the power consumed by the first heater is different to the power consumed by the second heater.

18. The controller according to claim 17, wherein water or ice is detected when the power consumed by the first heater is greater than the power consumed by the second heater, or when the power consumed by the second heater is greater than the power consumed by the first heater.

19. The controller according to claim 17, wherein the controller is configured to calculate the surface temperature by:

receiving the respective temperature sensor signal; and calculating the surface temperature from the respective temperature sensor signal, the power applied to the respective heater, and at least one thermal resistance between the respective heater and the surface of the structure.

20. The controller according to claim 17, wherein the controller is configured to control the power applied to the respective heater using the respective temperature signal.

21. The controller according to claim 17, wherein the respective power applied to the respective heater is sufficient to cause evaporation of water or ice in contact with the surface of the structure at the respective region.

22. The controller according to claim 17, wherein the controller is further configured to identify a region aft of the first heater having water or ice thereon by:

sensing the power being supplied to a heater aft of the first heater;

comparing the power being consumed to the heater aft of the first heater with the second power consumed by the respective second heater; and detecting the presence of water or ice on the surface of the structure based on the comparison of the respective powers consumed by the respective heater aft of the first heater and the second heater, wherein water or ice is detected when the power consumed by the heater aft of the first heater is different to the power consumed by the second heater.

23. A controller for detecting an icing condition in which ice may form on a structure exposable to an impinging airflow, the controller comprising:

a controller for detecting the presence of water on the surface of a structure exposable to an impinging airflow according to claim 17; and a temperature sensor for detecting an air temperature of the environment external to the structure, the temperature sensor being coupled to the controller for providing the controller with a temperature signal, wherein the controller is configured to detect an icing condition dependent on the detection of the presence of water on the surface of the structure and the air temperature being substantially at or below 10° C.

\*   \*   \*   \*   \*